(12) United States Patent
Reineccius et al.

(10) Patent No.: US 9,136,712 B2
(45) Date of Patent: *Sep. 15, 2015

(54) HIGH SPEED FEEDBACK ADJUSTMENT OF POWER CHARGE/DISCHARGE FROM ENERGY STORAGE SYSTEM

(71) Applicant: STEM, Inc., Milbrae, CA (US)

(72) Inventors: Stacey Reineccius, San Francisco, CA (US); David Erhart, San Mateo, CA (US); John Sellers, El Cerrito, CA (US)

(73) Assignee: STEM, INC., Milbrae, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/171,402

(22) Filed: Feb. 3, 2014

(65) Prior Publication Data

US 2014/0214226 A1 Jul. 31, 2014

Related U.S. Application Data

(62) Division of application No. 12/825,295, filed on Jun. 28, 2010, now Pat. No. 8,643,336.

(60) Provisional application No. 61/224,467, filed on Jul. 9, 2009, provisional application No. 61/221,473, filed on Jun. 29, 2009.

(51) Int. Cl.
  *H02J 4/00* (2006.01)
  *H02J 3/32* (2006.01)
(52) U.S. Cl.
  CPC .... *H02J 4/00* (2013.01); *H02J 3/32* (2013.01)
(58) Field of Classification Search
  CPC ........... H02M 7/44; G02J 3/383; G02J 3/386; G02J 3/382; Y02E 10/763; Y02E 10/563
  USPC .......... 700/295, 296; 320/107, 119, 125, 128, 320/134, 136, 155, 156
  See application file for complete search history.

(56) References Cited

U.S. PATENT DOCUMENTS 3,487,289 A 12/1969 McMurray
4,121,147 A 10/1978 Becker et al.
(Continued)

FOREIGN PATENT DOCUMENTS

EP 2101403 A2 9/2009
EP 2 204 658 A1 7/2010
(Continued)

OTHER PUBLICATIONS

Cha et al. "A New Soft Switching Direct Converter for Residential Fuel Cell Power System", IAS 2004. 2:1172-1177.

(Continued)

*Primary Examiner* — Charles Kasenge
(74) *Attorney, Agent, or Firm* — Artegis Law Group, LLP.

(57) ABSTRACT

The invention provides systems and methods for control of power charge/discharge from energy storage system. The invention also provides for power monitoring and management. A smart charge system may include a system sensor, one or more energy storage units, and a controller, which may receive information about the power demand, power provided by an electricity provider, and charge/discharge information from an energy storage unit. The information received may all be time synchronized in relation to a time based reference. The controller may provide instructions to an energy storage unit at a rapid rate.

14 Claims, 5 Drawing Sheets

Invention Analysis and Instruction Process

(56) References Cited

U.S. PATENT DOCUMENTS

| | | |
|---|---|---|
| 4,287,465 A | 9/1981 | Godard et al. |
| 4,399,396 A | 8/1983 | Hase |
| 4,559,590 A | 12/1985 | Davidson |
| 4,752,697 A | 6/1988 | Lyons et al. |
| 4,847,745 A | 7/1989 | Shekhawat et al. |
| 4,996,637 A | 2/1991 | Piechnick |
| 5,262,931 A | 11/1993 | Vingsbo |
| 5,274,571 A | 12/1993 | Hesse et al. |
| 5,369,353 A | 11/1994 | Erdman |
| 5,510,700 A | 4/1996 | Pomatto |
| 5,594,318 A | 1/1997 | Nor et al. |
| 5,595,506 A | 1/1997 | Robinson et al. |
| 5,620,337 A | 4/1997 | Pruehs |
| 5,909,367 A | 6/1999 | Change |
| 6,015,314 A | 1/2000 | Benfante |
| 6,018,203 A | 1/2000 | David et al. |
| 6,059,605 A | 5/2000 | Robinson et al. |
| 6,160,722 A | 12/2000 | Thommes et al. |
| 6,172,480 B1 | 1/2001 | Vandelac |
| 6,200,158 B1 | 3/2001 | Robinson |
| 6,268,715 B1 | 7/2001 | Oglesbee et al. |
| 6,301,132 B1 | 10/2001 | Vandelac |
| 6,310,789 B1 | 10/2001 | Nebrigic et al. |
| 6,388,421 B2 | 5/2002 | Abe |
| 6,404,655 B1 | 6/2002 | Welches |
| 6,420,801 B1 | 7/2002 | Seefeldt |
| 6,424,119 B1 | 7/2002 | Nelson et al. |
| 6,429,625 B1 | 8/2002 | LeFevre et al. |
| 6,522,031 B2 | 2/2003 | Provanzana et al. |
| 6,587,362 B1 | 7/2003 | Vithayathil |
| 6,606,552 B2 | 8/2003 | Haimerl et al. |
| 6,639,383 B2 | 10/2003 | Hoff et al. |
| 6,750,685 B1 | 6/2004 | Guerrero Mercado |
| 7,019,666 B2 | 3/2006 | Tootoonian Mashhad et al. |
| 7,031,859 B2 | 4/2006 | Piesinger |
| 7,157,810 B2 | 1/2007 | Kanouda et al. |
| 7,199,527 B2 | 4/2007 | Holman et al. |
| 7,248,490 B2 | 7/2007 | Olsen et al. |
| 7,262,694 B2 | 8/2007 | Olsen et al. |
| 7,385,373 B2 | 6/2008 | Doruk et al. |
| 7,456,519 B2 | 11/2008 | Takeda et al. |
| 7,676,334 B2 | 3/2010 | Matsuura et al. |
| 7,747,739 B2 | 6/2010 | Bridges et al. |
| 7,752,145 B2 | 7/2010 | Kelty |
| 7,804,183 B2 | 9/2010 | Arinaga |
| 7,933,695 B2 | 4/2011 | Yamaguchi |
| 8,053,921 B2 | 11/2011 | Ichikawa |
| 8,125,183 B2 | 2/2012 | Katsunaga |
| 8,149,114 B2 | 4/2012 | Hanft |
| 8,183,995 B2 | 5/2012 | Wang et al. |
| 8,643,336 B2* | 2/2014 | Reineccius et al. ........... 320/128 |
| 2002/0019758 A1 | 2/2002 | Scarpelli |
| 2002/0171436 A1 | 11/2002 | Russell |
| 2002/0173902 A1 | 11/2002 | Haimerl et al. |
| 2002/0190525 A1 | 12/2002 | Worden et al. |
| 2003/0007369 A1 | 1/2003 | Gilbreth et al. |
| 2003/0052644 A1* | 3/2003 | Nelson et al. ................. 320/107 |
| 2003/0057919 A1 | 3/2003 | Yang |
| 2004/0062059 A1 | 4/2004 | Cheng et al. |
| 2004/0262996 A1 | 12/2004 | Olsen et al. |
| 2004/0263116 A1 | 12/2004 | Doruk et al. |
| 2006/0023478 A1 | 2/2006 | Takeda et al. |
| 2007/0005195 A1 | 1/2007 | Pasquale et al. |
| 2007/0038396 A1* | 2/2007 | Zima et al. ...................... 702/65 |
| 2007/0117436 A1 | 5/2007 | Davis |
| 2007/0145952 A1 | 6/2007 | Arcena |
| 2007/0200433 A1 | 8/2007 | Kelty |
| 2008/0012667 A1 | 1/2008 | Colsch et al. |
| 2008/0183408 A1 | 7/2008 | Matsuura et al. |
| 2008/0272934 A1 | 11/2008 | Wang et al. |
| 2008/0279321 A1* | 11/2008 | Bickel et al. .................. 375/356 |
| 2009/0102424 A1 | 4/2009 | Tien et al. |
| 2009/0146423 A1 | 6/2009 | Arinaga |
| 2009/0160259 A1 | 6/2009 | Naiknaware et al. |
| 2009/0288896 A1 | 11/2009 | Ichikawa |
| 2010/0034003 A1 | 2/2010 | Rozman et al. |
| 2010/0082464 A1 | 4/2010 | Keefe |
| 2010/0114387 A1 | 5/2010 | Chassin |
| 2011/0221195 A1 | 9/2011 | Raju |
| 2012/0069619 A1 | 3/2012 | Badger et al. |
| 2012/0319748 A1 | 12/2012 | Luo |
| 2013/0030588 A1 | 1/2013 | Smith et al. |

FOREIGN PATENT DOCUMENTS

| | | |
|---|---|---|
| EP | 2 475 059 A1 | 7/2012 |
| JP | 2002-305842 A | 10/2002 |
| JP | 2006-141093 A | 6/2006 |
| JP | 2006-338889 A | 12/2006 |
| JP | 2008-141918 A | 6/2008 |
| JP | 2008-178215 A | 7/2008 |
| TW | 200849770 A | 12/2008 |

OTHER PUBLICATIONS

Choe et al. "A Parallel Operation Algorithm with Power-Sharing Technique for FC Generation Systems". 2009.725-731.

Chenier, Glen. Reversal of Fortune. Electronic, Design, Strategy, News. 2009. p. 62.

M.A. Kai, "Lessons Learned from the Texas Synchrophasor Network", IEEE-PES Innovative Smart Grid Technologies Conference, Berlin, Oct. 14-17, 2012.

* cited by examiner

HIGH SPEED FEEDBACK ADJUSTMENT OF POWER CHARGE/DISCHARGE FROM ENERGY STORAGE SYSTEM

CROSS-REFERENCE TO RELATED APPLICATIONS

This application is a divisional of U.S. patent application Ser. No. 12/825,295, filed Jun. 28, 2010, which claims the benefit of U.S. Provisional Application No. 61/221,473 filed Jun. 29, 2009 and U.S. Provisional Application No. 61/224,467 filed Jul. 9, 2009, which applications are hereby incorporated herein by reference in their entirety.

BACKGROUND OF THE INVENTION

Field of the Invention

Traditional systems, with non-intelligent discharge feeding loads, typically require a large energy storage capacity. In such systems, monitoring of power levels for billing and management purposes is done at relatively long intervals (e.g., 3 to 15 minutes, if not longer). Simple timer based charge windows (e.g., start charging at x time of day, etc.) are typical for any time sensitive charge applications assuming slow rates of charge. Power demand, although charged to customers at the local customer meter, is generally controlled by the utility or Demand Response Provider in 15 minute to 1 hour or longer intervals. Several examples of such non-intelligent systems include icelsystems.com, gridpoint.com, or redflownetworks.com who use 15 minute intervals or 'dumb' energy storage under peak shaving control as they being viewed in aggregate from the utility side of the meter.

Such traditional systems result in many disadvantages. For example, traditional systems are not level sensitive in discharge, thereby requiring larger energy storage than is cost effective for a customer to save money. The large size of energy storage required by this approach makes many useful efficiency applications non-economic and prevailing costs of energy storage over the last 100+ years have been significant. Furthermore, traditional systems miss brief intervals where a load is far less than target peak and un-necessarily discharges from an energy storage system into the load without economic or electrical benefit. Furthermore, power delivered on a given phase is not aligned to the power load on the same phase, resulting in upstream mismatches in load and so contributing to inefficiency and higher than necessary fuel consumption.

Thus, a need exists for more intelligent power charge and discharge systems and methods, which more effectively utilize an energy storage system.

SUMMARY OF THE INVENTION

An aspect of the invention is directed to a smart charge system comprising a system sensor in communication with at least one electricity provider and at least one premises load, wherein information provided by the system sensor is time synchronized with a time synchronization reference; at least one energy storage unit, wherein the energy storage unit can send information that is synchronized with the time synchronization reference; and a control computer which receives time synchronized information from the system sensor and the energy storage unit, and provides a charge/discharge instruction to the energy storage unit based on the received time synchronized information.

Another aspect of the invention is directed to a method of power monitoring and management comprising providing, at a controller, a desired limit load; receiving, at the controller, power demand load information; receiving, at the controller, state of charge information from an energy storage unit; and transmitting, from the controller to the energy storage unit, a charge/discharge instruction based on the desired limit load, the power demand load information, and the state of charge information, wherein the charge/discharge instruction is delivered at a fast sample rate. In some embodiments, the fast sample rate is every 15 minutes or less, or every 1 minute or less.

A method of power monitoring and management may be provided in accordance with another aspect of the invention. The method may comprise receiving sensor information from a system sensor in communication with at least one electricity provider and at least one premises load, wherein the sensor information is time synchronized with a time synchronization reference; receiving state of charge information from at least one energy storage unit, wherein the state of charge information is synchronized with the time synchronization reference; and providing a charge/discharge instruction to the energy storage unit based on the received sensor information and the received state of charge information.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for control of power charge/discharge from energy storage system. Such configurations may include high speed feedback power adjustment. Various aspects of the invention described herein may be applied to any of the particular applications set forth below or for any other types of power generation, control and distribution. The invention may be applied as a standalone system or method, or as part of an integrated power delivery or control system. It shall be understood that different aspects of the invention can be appreciated individually, collectively, or in combination with each other.

Figure 1:
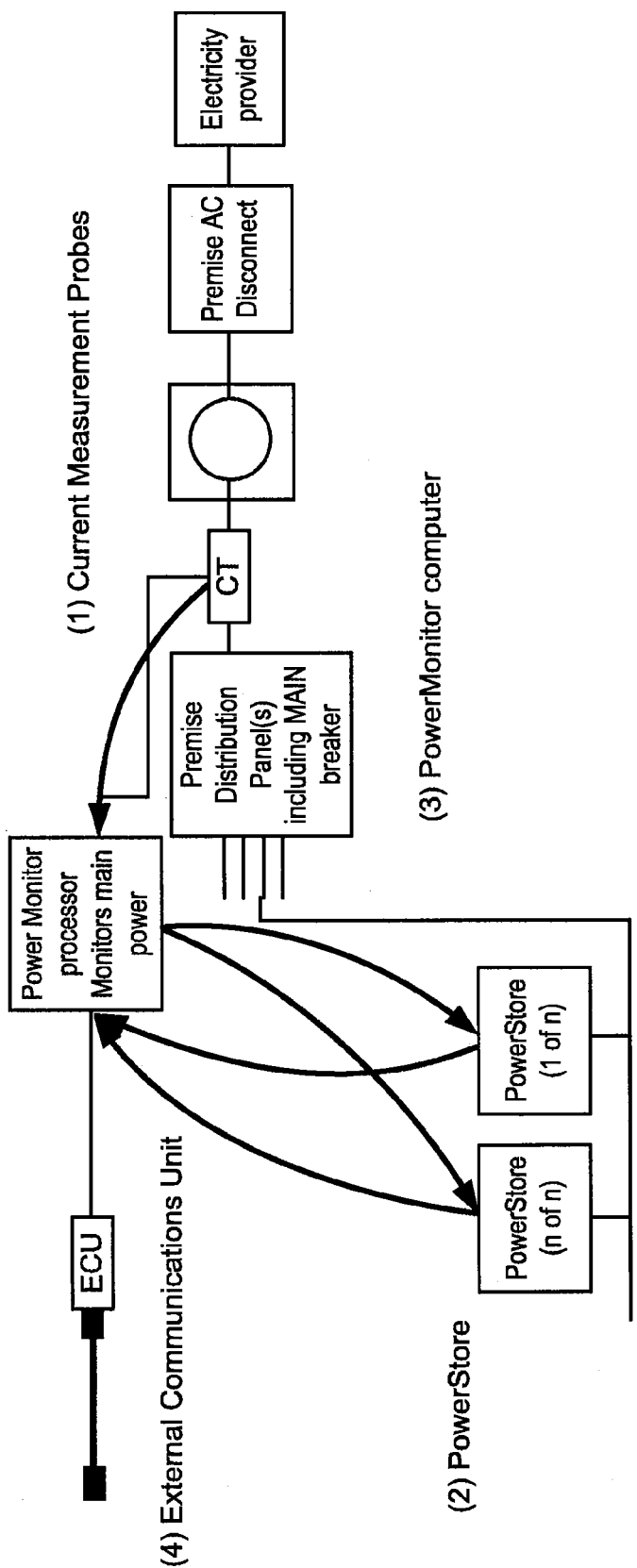
FIG. 1 shows a diagram of an embodiment of a smart charge system showing action flows.

FIG. 1 shows a diagram of an embodiment of a smart charge system showing action flows. A smart charge system may include an electricity provider, a premises distribution panel, a sensor interface module (SIM) measurement device, an energy storage unit (ESU), a site monitoring processor (SMP) computer, and an external communications unit (ECU).

In some embodiments, the electricity provider may be a utility or grid. In some embodiments, the electricity provider may be any third party energy provider. The electricity provider may utilize a generator source to provide electricity. The electricity provider may utilize any other known system in the art to provide electricity.

A smart charge system may also include a premises distribution panel. The premises distribution panel may deliver power to premises which may have a load. In some embodiments, the premises may include a residence, a small-scale commercial structure, a large-scale commercial structure, or any other establishment that may have a load. In some embodiments, the premises need not be a building or structure, but may include any device or apparatus that has a load, and thus requires power.

The premises distribution panel may include a main breaker. A premises distribution panel may be a component of an electricity supply system which may divide an electrical power feed into subsidiary circuits, while providing a protective fuse or circuit breaker for each circuit, in a common enclosure. In some implementations, a main switch, and optionally, one or more Residual-current devices (RCD) or Residual Current Breakers with Overcurrent protection (RCBO), may also be incorporated.

The electricity provider may be in communication with the premises distribution panel via a premise AC disconnect, one or more meter sockets with meters, and a SIM measurement device. Any meter socket and meter known in the art may be utilized to connect a distribution panel with an electricity provider, such as a local generator grid. In a preferable embodiment, a meter socket with meter may also include a meter socket insert, such as that described in U.S. patent application Ser. No. 12/716,258 filed on Mar. 2, 2010, which is hereby incorporated by reference in its entirety. A meter socket insert may allow for a quick interconnection between a premises distribution panel on a consumer side and a utility grid on a provider side, rather than requiring an upgraded breaker in the premises management panel, which may require extensive and time consuming work.

The SIM measurement device, which may also be referred to as a power measurement probe, may be a high speed-high accuracy sensor at a main entry to the premises. In preferable embodiments, the SIM measurement device may be on the consumer side of a meter in a typical installation. However, in alternate embodiments, the SIM measurement device may also be on the grid (supply) side. The SIM device may measure total power being supplied by a generator source to a given load. The SIM device may measure total power by measuring current and voltage at specific times on each phase of the service power for the premises.

The SIM device may be configured to provide such measurements at a high sample rate. In some instances, the SIM device may include an internal clock, or may be in communication with an external clock, in order to provide time references. The SIM device may utilize any time synchronization reference.

The smart charge system may also include one or more ESU, which may also be referred to as a PowerStore. An ESU may have controllable fast charge/discharge capability. In some embodiments, an ESU may have such fast charge/discharge capability due to the use of a bidirectional inverter-charger. The bidirectional inverter-charger may also be used for bidirectional energy conversion so that it may function as a DC to AC energy converter and/or an AC to DC energy converter within the same device or component. For example, a circuit may be provided that may function for bidirectional energy conversion. Within the circuit, current may flow in opposite directions, depending on the mode of operation. Thus a bidirectional energy converter may be able to function as an inverter and as a rectifier. In a preferable embodiment of the invention, an ESU may utilize a bidirectional energy converter, such as the converter described in U.S. patent application Ser. No. 12/731,070 filed on Mar. 24, 2010, which is hereby incorporated by reference in its entirety. In some instances, a dual processor may be provided for a bidirectional energy converter.

The ESU may include any system capable of storing energy, such as a battery, fuel cell, capacitor, supercapacitor, superconducting magnetic energy storage, any other electrochemical, electrical, or mechanical energy storage system, or any combination thereof. The ESU may be any energy storage system capable of being charged and discharged repeatedly. Any discussion herein of any particular type of ESU may also be applicable to any other type of ESU.

In some embodiments, the ESU may include a controller that may be able to gather information about the ESU and receive instructions relating to the ESU. For example, the controller may be able to monitor a state of charge for the ESU, charge and discharge capabilities for the ESU, and the current rate of charge/discharge. In some embodiments, the controller may report the gathered information. The controller may also receive instructions whether to charge or discharge, the power level to charge or discharge, the maximum duration of the charge or discharge in the case of loss of communication, the phase of power against which this is to apply for each phase, and/or other instructions. In some embodiments, the controller may be a computer or may include a processor.

Any number of ESUs may be provided within a smart charge system. For example, one, two, three, four, five, six, eight, ten, fifteen, twenty, or more ESUs may be provided in the system. For example, n ESUs may be provided, where n is any integer with a value of one or greater. In some embodiments, the ESUs may all be of the same type (e.g., the same type of battery), while in other embodiments different types of ESUs may be used in combination (e.g., any of the ESUs mentioned herein may be used in conjunction with any other of the ESUs mentioned). The ESUs may be connected in series, in parallel, or in any combination thereof. In some embodiments, a controller may be provided for each ESU, while in other embodiments, the controller may be provided for the entire group of ESUs, or for subgroups of ESUs.

The smart charge system may utilize an SMP computer, which may coordinate actions. The SMP computer may also be referred to as a PowerMonitor computer. There may be communications between the various units described in the smart charge system, and the SMP computer may coordinate the actions taken by the various units and monitor main power. The SMP computer may run appropriate software, which may be embedded as its own unit, or may be part of a storage cabinet. The SMP computer may be unit side and box mounted. The SMP computer may run a software or application according to a set of instructions, code, logic, or computer readable media. Any algorithm, calculation, or other steps may be implemented using tangible computer readable media, which may include code, logic, instructions for performing such steps. Such computer readable media may be stored in memory. One or more processor may access such memory and implement the steps therein. This may include the memory and/or processor of the SMP computer. The SMP computer may be specially programmed to perform the steps or calculations described herein.

An SMP computer may be any device capable of manipulating data according to a set of instructions. For example, an SMP computer may be a personal computer, a laptop, a personal digital assistant (PDA), mobile phone, or any other type of computing device. The SMP computer may include a microprocessor, memory, and/or a user interface device, such as a display. The SMP may be in communication with the premises distribution panel, the SIM device, and one or more ESUs. The SMP may receive information from the premises distribution panel, the SIM device, and the ESUs, and may accordingly provide instructions to the ESUs.

The smart charge system may also utilize an ECU in accordance with an embodiment of the invention. The ECU may securely transmit data, including data on time synchronization, performance, confirmations of downloaded instructions, updates, and so forth, to the central operations system. The smart charge system may include a time base reference, which may be used to synchronize all of the components of the system, which may be obtained via the ECU, or alternatively which may be internal to the system. For example, the time based reference may be used to synchronize a SIM device, ESUs, and an SMP computer. The time based reference may be internal or obtained from an external reference source such as GPS or networked based NTP.

Any components or units of the smart charge system may communicate with one another through a wire or wireless connection. For example, they may be connected to one another over a network, such as a local area network (LAN), or a wide area network, such as the Internet.

FIG. 1 shows an embodiment of the power monitoring system and how it may operate according some exemplary methods. The power monitoring system may operate by monitoring the flow of current and measuring the voltage on each phase of power, time stamping this information according to a time synchronized reference, sending the information via communications to a control computer, which may monitor state of activity, charge of ESU, and other information, and send instructions for rapid charge and/or discharge of an ESU. The power monitoring system may include (1) SIM measurement, which may send high sample rate data, time stamped against a synchronized time reference, to an SMP computer, giving data on source ID of measurements; (2) ESU, which may report current state of charge and charge/discharge capabilities, and current rate of charge/discharge to SMP computer, against the synchronized time reference; (3) SMP computer, which may compare current load as seen by SIM (measurement units) against desired level of electricity provider viewed load (as derived locally or instructed from remote via ECU) and may then issue commands to the ESU(s) instructing each unit with (i) charge or discharge, (ii) power level to charge or discharge, (iii) maximum duration of charge or discharge in case of loss of communication, and (iv) phase of power against which this may apply for each phase; and (4) ECU, which may security transmit data on time synchronization, performance, confirmations of downloaded instructions, updates, etc. to a central operations system.

A system sensor (SIM) may constantly monitor the flow of current and measures voltage on each phase of power. Thus, the system sensor may be able to monitor the power flow provided by an electricity provider to the premises. Preferably, this data may be time stamped according to a time synchronized reference. In some embodiments, the time synchronized reference may be provided by a clock. The clock may be a system sensor clock or a controller clock, any other clock within the power monitoring system, or any other clock external to the power monitoring system. The time synchronized reference may be internal to the system sensor, it may be internal to the power monitoring system, or it may be external to the power monitoring system.

Preferably, the system sensor may be able to monitor the power flow at a high sample rate. For example, the system sensor may be able to monitor current and voltage every 15 minutes or less, every five minutes or less, every three minutes or less, every two minutes or less, every one minute or less, every 45 seconds or less, every 30 seconds or less, every 15 seconds or less, every ten seconds or less, every five seconds or less, every four seconds or less, every three seconds or less, every two seconds or less, every second or less, every 500 ms or less, every 200 ms or less, every 100 ms or less, every 50 ms or less, or every 10 ms or less. In some examples, the high sample rate may be sampling at about 4 times/hr, 6 times/hr, 12 times/hr, 20 times/hr, 1 time/min, 2 times/min, 4 times/min, 6 times/min, 12 times/min, 20 times/min, 1 time/see, 4 times/sec, 10 times/sec, 50 times/sec, 100 times/sec, 500 times/sec, or 1000 times/sec or more. Thus, the system sensor may be able to more or less continuously monitor the power flow from the electricity provider in fine detail.

The system sensor may be provided as a consumer or customer side sensor. This may be advantageous over systems where such sensors are provided on the utility or supply side. Having the system sensor on the customer side may enable the system sensor to be applied locally to a pre-existing system, without requiring any action by the electricity provider. The system sensor may be installed on pre-existing equipment. Also, in some embodiments, the system sensor and/or a meter may be provided on the customer side in smaller scales, such as residences, homes, or small commercial establishments.

The system sensor may send information, such as power information, which may include voltage and current information, via communications to a control computer. The control computer (SMP) may maintain the current state of activity and charge of a battery (or any other ESU) as well as charge limits and other parameters for algorithms programmed into the control computer. The control computer may receive power information from the system sensor, as well as load information from a premise distribution panel, and information from one or more batteries. The control computer may also receive time synchronization information from an ECU or any other time synchronization reference. Any information that the control computer may receive may be time stamped. Alternatively, the control computer may have an internal time synchronization reference. The control computer may have a control computer clock. The control computer clock may or may not be time synchronized to another clock within the system or external to the system.

The control computer may instruct one or more batteries (or any other ESU) in rapid fashion. Such instructions may include time synchronization information, as well as instructions whether to charge or discharge, the power level to charge or discharge, the maximum duration of charge or discharge in case of loss of communication, or the phase of power against which this is to apply for each phase. Advantageously, the instructions provided by the control computer may depend on feedback provided by the battery and other units within the power monitoring system. For example, charge/discharge instructions provided by the control computer may depend on information provided by the battery, system sensor, and/or the ECU. Any such information may be time stamped in accordance with a time synchronization reference. Also, the instructions may include default instructions in case communication is lost, and feedback is no longer provided. Such default instructions may take the latest feedback into account, which may allow for updated, improved performance, even when connections are lost.

Preferably, the control computer may instruct and/or monitor the battery in rapid fashion. For example, the control computer may instruct the battery in time increments that may be 30 seconds or less, 15 seconds or less, ten seconds or less, five seconds or less, three seconds or less, two seconds or less, one second or less, 500 ms or less, 100 ms or less, 50 ms or less, 10 ms or less, or 1 ms or less. The control computer may instruct the battery at a high sample rate. Any sample rate, including those discussed elsewhere herein, may be used. In some instances, the control computer may also receive information from the battery at similar time increments. The control computer may send instructions to the battery in rapid fashion, and the battery may be able to respond in similarly rapid fashion. The battery may have a speedy response via bidirectional energy converters, including those described previously.

The batteries may be instructed so that the inverters are to discharge, or if below a limit, the batteries may be set to charge. For example, if the battery state of charge falls below a minimal threshold, the battery may be set to charge, or at least not discharge, even during peak time. In some instances, the batteries may be instructed to charge if the battery is not fully charged and an algorithm of the control computer does not otherwise indicate to not charge. In some embodiments, the battery may be charged even during peak time.

In some embodiments, a plurality of batteries may be provided. Each battery may have the same state of charge or a different state of charge. A control computer may receive information about the state of charge of each battery. The control computer may receive information about the average state of charge of the various batteries or may receive information about each state of charge for each battery or groups of batteries. Each battery may receive charge/discharge instructions. In some embodiments, the charge/discharge instructions to each battery may be the same. Alternatively, charge/discharge instructions may vary from battery to battery or from groups of batteries to groups of batteries. In some embodiments, the charge/discharge instructions to each battery may depend on the state of charge of that battery. In some embodiments, the charge/discharge instructions may depend on the state of charges of the other batteries. In some embodiments, the charge/discharge instructions to a battery may depend on the state of charge of each battery in the system or within the group.

By discharging an energy storage unit when the premise demand is above the desired limit, the apparent demand (power demand as seen by the utility meter) may be reduced to the desired limit. The power provided by the energy storage unit may make up the difference between the actual premise demand and the desired limit. Thus, the apparent demand on the electricity provider may be at the desired limit. In some embodiments, the desired limit may be a constant value, or in other embodiments the desired limit may vary. The desired limit may be determined by a control computer or the power monitoring system, or any external device. The desired limit may be determined by a user input, such as a customer input.

By discharging an energy storage unit rapidly (e.g., at <1 second intervals, or any other time intervals mentioned) the apparent demand/power level may be kept smooth and may avoid harmonics being generated in the electric system. The rapid discharge of the energy storage system may enable the system to react more quickly to rapid fluctuations of the actual load.

Similarly, by charging the energy storage in short intervals when the premise demand (plus charge desired by the control computer) is known to be below the desired limit (net of current discharge by the energy storage), the system may recharge the energy storage. This may occur at off-peak and/or peak times. The net state of charge of the energy storage may be measured and reported through the communications means to the control computer at the end of each interval of charge/discharge. Any of these actions may take place at a rapid rate (e.g., at <1 second intervals, or any other time intervals mentioned). The rapid charge of the energy storage system may advantageously allow for the state of charge of the energy storage system to not decrease as much as traditional systems that do not allow for charging during peak hours. For example, the rapid charge may allow the energy storage system state of charge to decrease by about 80% or more, 60% or more, 50% or more, 40% or more, 30% or more, 20% or more 15% or more, 10% or more, or 5% or more than in traditional systems.

This opportunistic short duration charge may allow for a greater amount of energy capacity to be present for the next charge/discharge decision by the algorithm running in the control computer.

Taken together, this short interval charge and discharge procedure may serve to reduce the size of the necessary energy storage needed to achieve a specific level of power demand reduction. This reduction may make the cost effectiveness much greater and physical issues of installation easier by reducing the physical weight and volume of energy storage required to meet the target power level. The exact level of reduction depends on the specific load characteristics of an installation site but can be expressed, generally by the following formulas:

Traditional Technologies:

$$EnergyStorageCapacity(x) =$$

$$(MinimumChargeLevel \% * MaxloadinKWH) +$$

-continued $$\frac{\sum_{n=1}^{Intervals\ in\ duration} [[(Power_{over})]IntervalLength]}{(DischargeEfficiency)}$$

For a Smart Charge System:

$$EnergyStorageCapacityNEW(x) =$$
$$(MinimumChargeLevel\ \% * MaxloadinKWH) +$$
$$\sum_{n=1}^{Intervals\ in\ duration} \left[ \begin{pmatrix} \frac{Power_{over}}{(DischargeEfficiency)} - \\ (Power_{under} * ChargeEfficiency) - \\ (Power_{generator}) \\ IntervalLength \end{pmatrix} \right]$$

where 'n' is the number of the interval in the total period being stored for a desired duration of interest.

The formula shows that the energy storage size required using a smart charge technique may be smaller than the size required under current commonly used techniques. Further, data shows that the higher the rate of measurement (i.e. the shorter the time frame) that the more power under the limit targeted there will be, thus further reducing the energy storage capacity needed.

Figure 2:
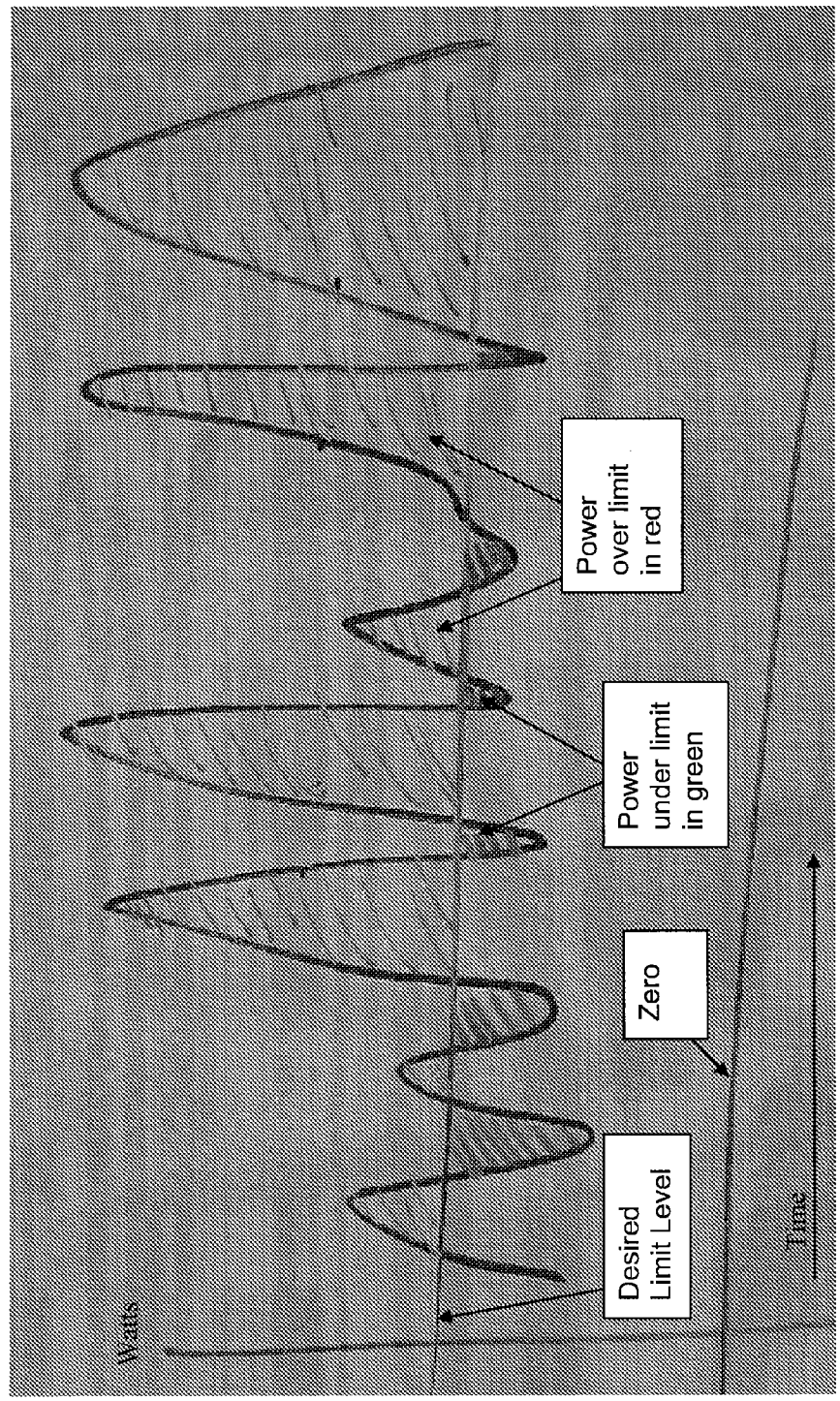
FIG. 2 shows an example of a power load and a desired limit level.

FIG. 2 shows an example of a premise power load and a desired limit level. FIG. 2 shows how a power load may fluctuate over time. A desired limit level may be determined by the smart charge system. In some embodiments, the desired limit level may be constant over time, while in other embodiments the desired limit load may vary. A desired limit load may be automatically selected by a program or algorithm, or may be manually selected by a user. The power over the desired limit level may be displayed, as well as the power under the desired limit load. A zero level may also be displayed as a point of reference.

In some embodiments, an energy storage unit may be utilized such that the apparent demand to an electricity provider is the desired limit load. When the premise power load exceeds the desired limit load, the energy storage unit may be discharged to make up the difference. In some embodiments, when the state of charge of the energy storage unit falls beneath a certain threshold, the energy storage need not be discharged even if the apparent demand is above the desired limit load. Similarly, when the premise power load is below the desired limit load, the energy storage unit may be charged so that the apparent demand is at the desired limit load. If the energy storage unit is already fully charged, the energy storage unit need not be charged even if the apparent demand is below the desired limit load. In another embodiment, the energy storage may be utilized to determine that the apparent demand does not exceed the desired limit load. In some instances, the apparent demand may fall beneath the desired limit load. Other algorithms may be provided that may govern the charging and/or discharging of the energy storage unit.

In some embodiments, the discharge of the energy storage unit (ESU) may be controlled so that the desired limit load is met or not exceeded. In preferable embodiments, this may be achieved by staying at the current level. The voltage level may be varied accordingly. In other embodiments, a desired limit load may be achieved by staying at the voltage level, while allowing the current load to vary accordingly.

As discussed previously, when a higher rate of measurement and response is provided, more power may result in falling below the limit load line. Advantageously, the needed energy storage capacity for a given level of power demand level reduction may be significantly reduced. Another advantage of utilizing the smart charge system may be that the energy storage depth of discharge is reduced resulting a longer working life of the energy storage component. For example, the energy storage component with a high rate of measurement may have about a 60% or more, 50% or more, 40% or more, 30% or more, 20% or more 15% or more, 10% or more, or 5% or more longer life than an energy storage component in a traditional system. With a longer life and reduced size, the effective cost of energy storage for a given level of return from demand charge reduction may be reduced, thereby making the solution more cost effective.

Another benefit of the smart charge system is that it may be easily integrated into a pre-existing power system. By having components that are provided on the customer side, instead of the utility side, individual entities may easily integrate the smart charge system into a pre-existing power system. For example, a system sensor may be on the customer side. Similarly, a control computer and/or energy storage unit may be on the customer side. Furthermore, after easy installation on the customer side, a customer need not change the customer's behavior; the system may operate automatically. The customer may interact with an electricity provider in the same manner as prior to installation of the system, but the system may act on the customer side to allow the customer to save on the peak demand charge portion of the customer's electricity bill.

With a more cost effective energy storage capacity to effect ratio, new applications may be opened including:

By reducing the customer's apparent peak demand the customer may save on the peak demand charge portion of their electricity bill.

By keeping the power demand lower through the additional local supply from the energy storage, the power factor of the local premise may be improved.

By lowering the average apparent demand to the utility the efficiency losses in the transmission may be reduced, and distribution grid as well as the transmission lines may be less loaded and so have lower loss in aggregate leading to lower fuel consumption for a given level of energy delivery.

By extending the effective life of motor driven equipment, especially multiphase motors, by balancing the power quality on the phases preventing equipment from overheating due to bad power.

The customer using the invention does not have to change out, or modify current equipment or procedures to realize value from demand savings.

By leveling the power demand, the generator at the main grid electricity provider delivering power may run more efficiently, reducing its fossil fuel consumption and lowering generation losses presently seen as heat which then require cooling resources. Overall reductions in green house gas (GHG) production may be seen as a result of this impact from the Invention.

Figure 3A:
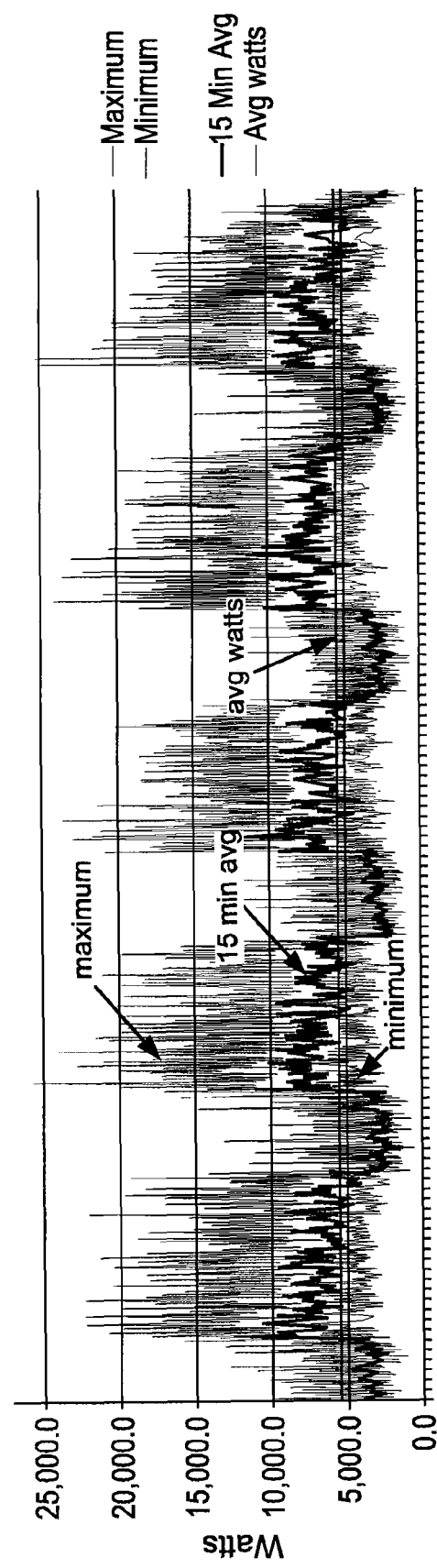
FIG. 3A shows an example of a typical power load over a five day period.

FIG. 3A shows an example of a typical power load over a five day period. The typical power load may include a maximum power load and a minimum power load. Both the maximum power load and the minimum power load may fluctuate wildly over time. When a high sample rate is taken, the variation in the maximum and minimum power loads become apparent. The maximum power demand is shown in pale blue and is the upper fluctuating line of the chart. The minimum power demand is shown in pale pink and is the lower fluctuating line on the chart. There may be a significant difference in the true power peak demand and the minimum demand.

Figure 3B:
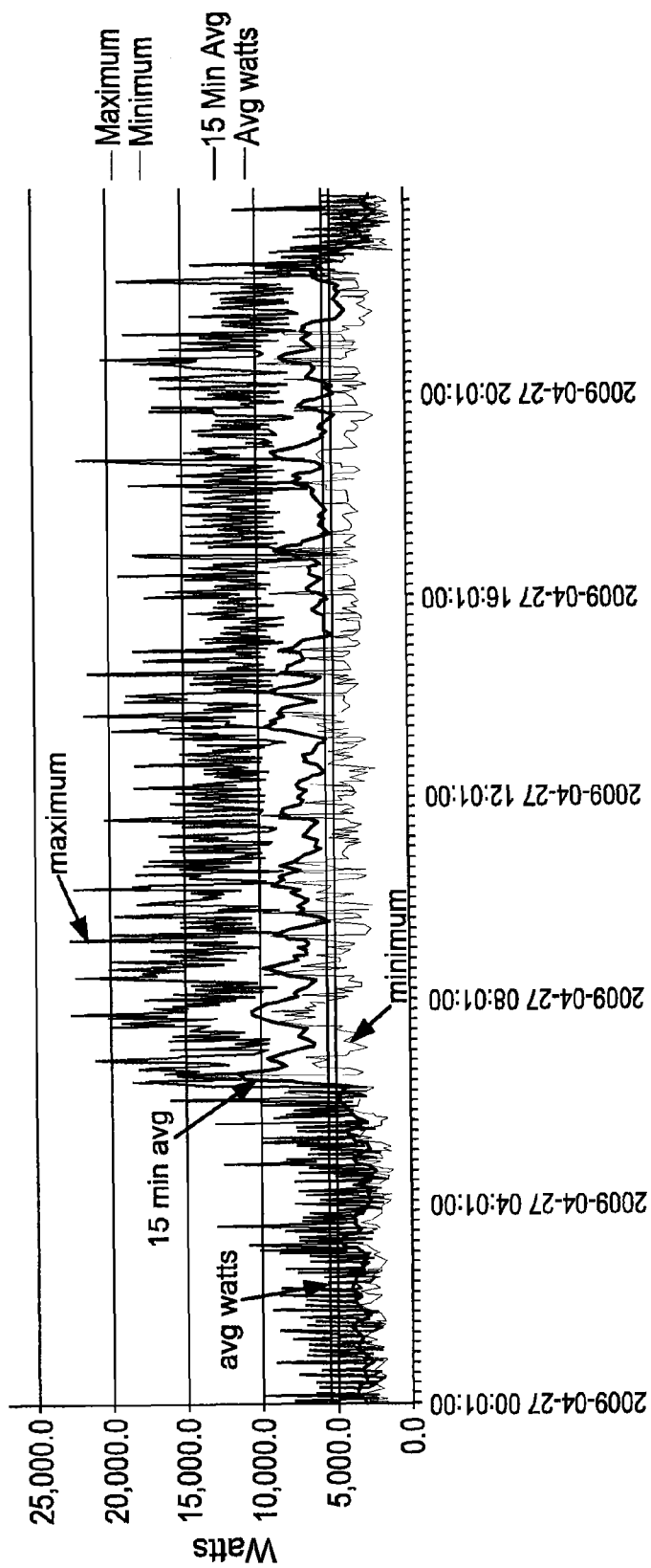
FIG. 3B shows an example of a typical power load at a higher resolution over a one day period.

The chart also includes a 15 minute average current. The 15 minute average current falls between the maximum and minimum power loads. The 15 minute average current may also fluctuate. The 15 minute average is shown in bright blue and is the fluctuating line between the maximum and minimum loads. The chart also includes the average number of watts for the time period. The average watts for that time period is displayed as a constant horizontal orange line. For some of the time, the 15 minute average power demand is over the average watts line, and for some of the time, the 15 minute average power demand is below the average watts line. The average watts line may be the load as seen by the utility based on traditional FIG. 3B shows an example of a typical power load at a higher resolution over a one day period. The typical one day power load may include a maximum power load and a minimum power load. Both the maximum power load and the minimum power load may fluctuate wildly over time. The variation in the maximum and minimum power loads may become apparent at the higher resolution. The maximum power demand is shown in pale blue and is the upper fluctuating line of the chart. The minimum power demand is shown in pale pink and is the lower fluctuating line on the chart. There may be a significant difference in the true power peak demand and the minimum demand.

The chart also includes a 15 minute average current. The 15 minute average current falls between the maximum and minimum power loads. The 15 minute average current may also fluctuate. The 15 minute average is shown in bright blue and is the fluctuating line between the maximum and minimum loads. In some instances, portions of the 15 minute average may be greater than the maximum load or less than the minimum load. In some parts, the 15 minute average may not fluctuate as much as the maximum or minimum loads. The chart also includes the average number of watts for the time period. The average watts for that time period is displayed as a constant horizontal orange line. For some of the time, the 15 minute average power demand is over the average watts line, and for some of the time, the 15 minute average power demand is below the average watts line. The 15 minute average power demand may cross the average watts line multiple times during the day, e.g., during the peak period.

The higher sample rate, as illustrated in FIG. 3B may be contrasted with what is used by traditional utility and battery approaches. Traditional utility and battery approaches may not have as high a sampling rate and do not achieve the level of resolution that shows the variation in power demand.

Figure 4:
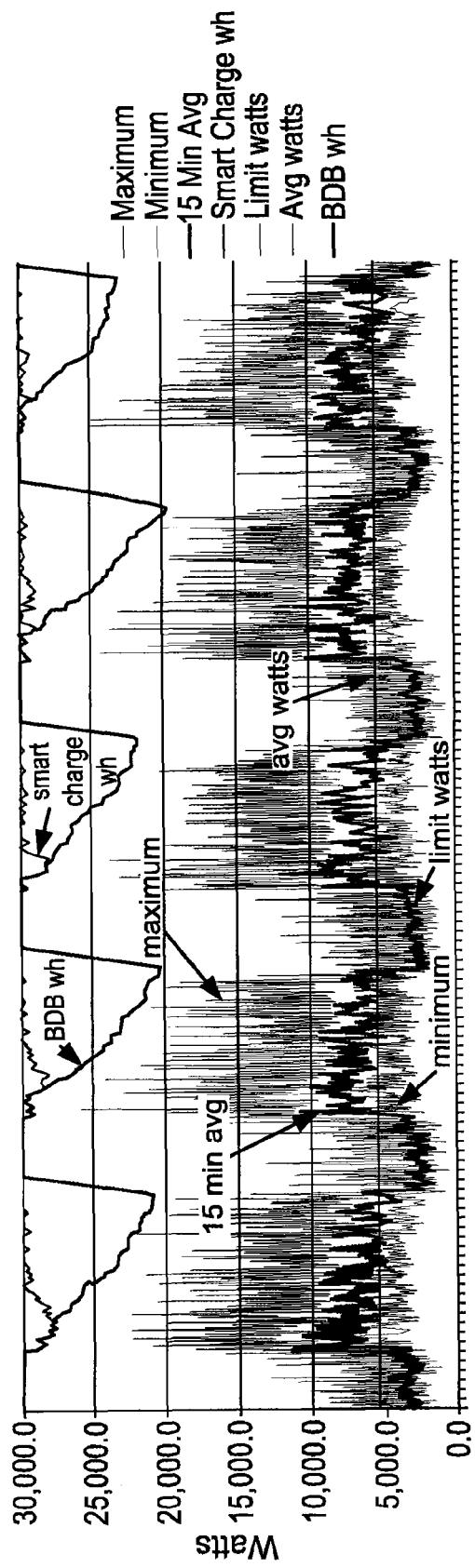
FIG. 4 shows a diagram of a discharge curve for smart charged energy storage along with a comparison of energy storage size needed to achieve same level of peak load adjustment.

FIG. 4 shows a diagram of a discharge curve for smart charged energy storage along with a comparison of energy storage size needed to achieve same level of peak load adjustment. The top portion of the diagram shows the watts hours capacity required by a traditional standard energy storage application method to achieve peak demand reduction to a target level. The capacity required by the traditional energy storage application is shown in red and starts off at a set level at the end of an off-peak time period, and gradually decreases as the peak time period progresses. The top portion of the diagram also shows the watthour capacity required by a high speed "smart" energy storage application method. The capacity required by the smart energy storage application is shown in green and also starts off at a set level at the end of an off-peak time period, and fluctuates as the peak time period progresses. However, since in the smart system, the energy storage may be recharged, even during the peak period, the energy storage state of charge does not decrease as much as the energy storage in a traditional application. The energy storage may be both charged and discharged during peak hours. Thus, in a smart system, a smaller energy storage may be required than in a traditional energy storage system.

The diagram also shows maximum and minimum loads, as well as a 15 minute average load. The diagram also includes the limit watts shown in bright blue. The limit watts may be an apparent demand as seen by a utility, and in some embodiments does not exceed a certain threshold value. For example, as shown in the diagram, the limit watts may roughly follow the 15 minute average load but be prevented by properly timed discharge from exceeding a particular threshold.

Any of the systems, methods, or devices described may utilize any components, features, or steps known in the art, including but not limited to U.S. Pat. No. 5,369,353; U.S. Pat. No. 6,522,031; U.S. Pat. No. 4,752,697; U.S. Patent Publication No. 2003/0007369; U.S. Pat. No. 5,274,571; U.S. Patent Publication No. 2002/0190525; U.S. Patent Publication No. 2007/0200433; U.S. Pat. No. 4,287,465; U.S. Patent Publication No. 2007/0145952; U.S. Patent Publication No. 2009/0146423, which are hereby incorporated by reference in their entirety.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

The invention claimed is:

1. A smart charge system, comprising:
a control computer that is configured to:
   receive system sensor information from a system sensor configured to measure power drawn by at least one premises load, the system sensor information comprising an indication of the power drawn and a timestamp corresponding to the time at which the power drawn is measured;
   receive energy storage unit information from at least one energy storage unit that is configured to switch between at least two modes of operation, and monitor a current state of charge of the energy storage unit, wherein the at least two modes of operation include a charge mode and a discharge mode; and
   cause the mode of operation of the at least one energy storage unit to switch between the charge mode and the discharge mode based on the system sensor information and the energy storage unit information.

2. The smart charge system of claim 1, further comprising a plurality of energy storage units that includes the at least one energy storage unit.

3. The smart charge system of claim 1, wherein the control computer is further configured to control the mode of operation for each of the plurality of energy storage units.

4. The smart charge system of claim 1, wherein the system sensor is further configured to monitor power at a sample rate greater than or equal to $1/60^{th}$ Hz.

5. The smart charge system of claim 1, wherein the information received from the system sensor and the at least one energy storage unit is time stamped according to a time synchronization reference.

6. The smart charge system of claim 5, wherein the time synchronization reference is obtained from a GPS signal.

7. A method of power monitoring and management, comprising:
   receiving system sensor information from a system sensor configured to measure power drawn by at least one premises load, the system sensor information comprising an indication of the power drawn and a timestamp corresponding to the time at which the power drawn is measured;
   receiving energy storage unit information from at least one energy storage unit that is configured to switch between at least two modes of operation, and monitor a current state of charge of the energy storage unit, wherein the at least two modes of operation include a charge mode and a discharge mode;
   switching the mode of operation of the at least one energy storage unit between the charge mode and the discharge mode based on the system sensor information and the energy storage unit information; and
   transmitting a mode switch instruction that causes the mode of operation of the energy storage unit to switch between the charge mode and the discharge mode based on the system sensor information and the energy storage unit information.

8. The method of claim 7, wherein the system sensor monitors power at a sample rate greater than or equal to $1/60^{th}$ Hz.

9. The method of claim 7, wherein the information received from the system sensor and the at least one energy storage unit is time stamped according to a time synchronization reference.

10. The method of claim 9, wherein the time synchronization reference is obtained from a GPS signal.

11. A non-transitory computer-readable storage medium including instructions that, when executed by a control computer, cause the control computer to monitor and manage power, by performing the steps of:
    receiving system sensor information from a system sensor configured to measure power drawn by at least one premises load, the system sensor information comprising an indication of the power drawn and a timestamp corresponding to the time at which the power drawn is measured;
    receiving energy storage unit information from at least one energy storage unit that is configured to switch between at least two modes of operation, and monitor a current state of charge of the energy storage unit, wherein the at least two modes of operation include a charge mode and a discharge mode;
    switching the mode of operation of the at least one energy storage unit between the charge mode and the discharge mode based on the system sensor information and the energy storage unit information; and
    transmitting a mode switch instruction that causes the mode of operation of the energy storage unit to switch between the charge mode and the discharge mode based on the system sensor information and the energy storage unit information.

12. The computer-readable medium of claim 11, wherein the system sensor monitors power at a sample rate greater than or equal to $1/60^{th}$ Hz.

13. The computer-readable medium of claim 11, wherein the information received from the system sensor and the at least one energy storage unit is time stamped according to a time synchronization reference.

14. The computer-readable medium of claim 13, wherein the time synchronization reference is obtained from a GPS signal.

\* \* \* \* \*